United States Patent [19]

Fukuoka et al.

[11] Patent Number: 4,471,031
[45] Date of Patent: Sep. 11, 1984

[54] Al-Si-Pb BEARING ALLOY AND BEARING COMPOSITE

[75] Inventors: Tatsuhiko Fukuoka; Souzi Kamiya, both of Aichi; Hiroshi Kanemitsu, Toyota, all of Japan

[73] Assignee: Taiho Kogyo Co., Ltd., Toyoto, Japan

[21] Appl. No.: 312,281

[22] Filed: Oct. 15, 1981

[51] Int. Cl.³ .............................................. B32B 15/04
[52] U.S. Cl. .................................... 428/653; 148/415; 148/416; 148/417
[58] Field of Search ............... 420/534, 536, 537, 546, 420/548; 148/437, 438, 439, 440, 415–417; 428/653

[56] References Cited

U.S. PATENT DOCUMENTS 4,153,756  5/1979  Iwahana et al. .................... 428/653

FOREIGN PATENT DOCUMENTS 1222262  2/1971  United Kingdom .

OTHER PUBLICATIONS

SAE Technical Paper Series 810199, (1981), "Aluminum Based Crankshaft Bearings for the High Speed Diesel Engine".

Primary Examiner—R. Dean
Attorney, Agent, or Firm—Armstrong, Nikaido, Marmelstein & Kubovcik

[57] ABSTRACT

An aluminum base bearing alloy having outstanding seizure resistance, fatigue resistance and wear resistance is provided. The alloy comprises, in addition to aluminum, 0.5–5 wt. % of Si and 0.5–8 wt. % of at least one of Pb, In, Tl, Cd and Bi and contains at least 5 modular Si particles having a diameter of at least 5 μm per $3.56 \times 10^{-2} (mm)^2$ of cross-sectional area of the alloy. The bearing alloy may optionally contain at least one additional element selected from Cu, Mg, Mn and Cr. A bearing material is provided by pressure welding the aluminum base bearing alloy to a backing steel sheet.

5 Claims, 8 Drawing Figures

Al-Si-Pb BEARING ALLOY AND BEARING COMPOSITE

BACKGROUND OF THE INVENTION (1) Field of the Invention

This invention relates to aluminum base bearing alloys and bearing materials and, particularly, to aluminum base bearing alloys in which a specified number of silicon particles of a specified size are dispersed in the aluminum matrix.

(2) Background of the Invention

Aluminum alloys are widely used as bearings in internal combustion engines, e.g., as connecting rod bearings and crankshaft bearings in automobile and marine engines. These bearings are resistant to corrosion in the engine environment and thus are highly advantageous for such use.

Materials employed as bearings in internal combustion engines are required to withstand high loads and high temperatures. Much effort has been directed in recent years, therefore, to providing aluminum base bearing alloys having high resistance to seizure, fatigue and wear under the conditions encountered in these engines.

U.S. Pat. No. 4,153,756 discloses Al-Sn base bearing alloys having a low degree of softening and, consequently, high fatigue strength, under high temperature conditions. The alloy is provided by adding chromium or zirconium to a basic alloy consisting of 10 to 30 wt.% tin and the remainder aluminum. Copper or both copper and beryllium can also be added to the alloy.

Al-Sn base bearing alloys comprising 3.5-35 wt.% of Sn, 0.1-1.0 wt.% of Cr and 1-10 wt.% in total of one or more members selected from Si, Cr, Mn, Sb, Ti, Zr, Ni and Fe, the remainder being aluminum, are also disclosed in the prior art as having high fatigue strength and, additionally, good wear resistance.

G. C. Pratt and C. A. Perkins in a paper entitled "Aluminum Based Crankshaft Bearings for the High Speed Diesel Engine", SAE Technical Paper Series 810199 (1981), describe the development of an engine bearing lining alloy for the high speed diesel engine and which has the composition Si (11 wt.%), Cu (1 wt.%) and the remainder Al. The alloy is described as having superior seizure resistance as compared to lead bronze on test rigs under conditions of sparse lubrication and controlled misalignment. It is further described that the casting procedure adopted and the subsequent processing of the alloy to bimetal ensure that the silicon particles are restricted to a few microns in size and that the silicon particle size is an important factor in determining the extent of compatibility (defined in the paper as the resistance of a bearing alloy to local welding on to a steel counterface); the highest degree being obtained only when there is a complete absence of coarse particles. The casting procedure and processing of the alloy to bimetal, however, are not described.

The mere inclusion of silicon in an aluminum base bearing alloy, however, does not ensure that the bearing alloy will possess consistently superior resistance to seizure, fatigue and wear under the severe loads and temperature conditions encountered in modern internal combustion engines and, particularly, in automobile engines which have shafts made of spheroidal, or nodular, graphite cast iron or other coarse material.

It is an object of the present invention, therefore, to provide an aluminum base bearing alloy and bearing composite which consistently possesses a superior balance of seizure, fatigue and wear resistance under high loads and high temperatures and when used as a bearing surface with nodular cast iron materials.

SUMMARY OF THE INVENTION

According to the present invention this and other objects are obtained by providing an aluminum base bearing alloy which contains 0.5-5 wt.% Si and 0.5-8 wt.% of at least one of Pb, In, Tl, Cd or Bi and in which at least 5 particles of Si which have a nodular, or "lumpy", shape and a diameter of at least 5 μm are provided per $3.56 \times 10^{-2}$(mm)$^2$ of cross-sectional area of the bearing alloy. The bearing alloy of the invention may optionally include up to 2 wt.% of Cu or Mg and up to 1 wt.% of Cr for providing other desired properties.

In another embodiment of the invention a bearing material is provided by pressure welding the bearing alloy to a backing steel.

DESCRIPTION OF PREFERRED EMBODIMENTS

The aluminum base bearing alloy according to the present invention contains 0.5-5 wt.% of Si and 0.5-8 wt.% of at least one of Pb, In, Tl, Cd and Bi. The superior resistance to seizure, fatigue and wear of the bearing alloy of the present invention is not obtained when the alloy contains less than about 0.5 wt.% of Si. Amounts of Si of more than about 5 wt.% do not provide significantly better properties (although these high amounts provide better seizure resistance under conditions of high-load and use of low viscosity oil) and tend to decrease the wear resistance and strength of the alloys. Preferably, the alloy contains about 2–5 wt.% of Si.

The silicon (Si) is present in the form of precipitates in the aluminum matrix of the alloy of the invention. At least 5 particles per $3.56 \times 10^{-2}(\text{mm})^2$ of cross-sectional area of the bearing alloy of the Si must be in the form of nodular particles having a diameter of at least 5 $\mu$m. As employed herein to define the shape of the particles, the term "nodular" is intended to mean an irregular, rounded lump as opposed to flat flake-like or needle-like particles. Nodular particles are required since flat or needle-like particles are brittle and may tend to disintegrate during use and adversely affect the antiseizing properties of the bearing alloy.

Also, as employed herein, the term "diameter" is intended to refer to the maximum dimension of a particle when viewed in a particular cross-sectional area of the alloy as explained below.

At least 5 nodular Si particles having a diameter, or size, of 5 $\mu$m must be provided in a cross-sectional area of the bearing alloy of $3.56 \times 10^{-2}(\text{mm})^2$. The area of $3.56 \times 10^{-2}(\text{mm})^2$ is chosen for convenience and is based on the viewing area of the microphotography equipment of the inventors. The number of Si particles per unit area can be modified by employing the appropriate conversion factors. For example, the above-described particle number/area limitation corresponds to $1.4 \times 10^8$ particles per $\text{m}^2$. It is also noted that the number of particles per cross-sectional area of the bearing alloy is that determined in a horizontal cross-section of a sheet of the alloy, i.e., a cross-section that is parallel to the surface of the sheet (and viewed in a direction perpendicular to the surface thereof) when prepared according to a process as described below. The size of Si particles measured in a vertical cross-section of a sheet of the alloy is smaller than that measured in a horizontal cross-section. Additionally, it is noted that the quantity limitations described above may not be fulfilled on the surface of a sheet of the alloy directly after its machining.

If the nodular particles of silicon are less than 5 $\mu$m, the bearing alloy will not have exceptional seizure or wear resistance. On the other hand, there is a practical upper limit of about 40 $\mu$m for the size of the Si particles because with bearing alloys containing particles above about 40 $\mu$m machining of the bearings becomes difficult.

To achieve the desired levels of seizure resistance the number of the nodular particles above 5 $\mu$m per $3.56 \times 10^{-2}(\text{mm})^2$ of cross-sectional area of the alloy must be at least 5. The maximum number of particles of any given size is of course limited by the amount of Si contained in the alloy. Typically, the desired properties of the aluminum base bearing alloys of the present invention are achieved when the number of Si particles having a size of at least 5 $\mu$m and, particularly, having a size between 5–40 $\mu$m is less than the maximum number of particles possible based on the amount of Si contained in the alloy; the balance of the Si being particles of less than 5 $\mu$m.

Seizure resistance of the bearing alloy according to the present invention increases as the size of the nodular Si particles increases. On the other hand, the number of larger particles is limited because the larger particles tend to decrease the fatigue resistance of the bearing alloys. To obtain bearing alloys having the highest seizure resistance, the bearing alloy of the invention will preferably contain, per $3.56 \times 10^{-2}(\text{mm})^2$ of cross-section area, at least 5 particles having a diameter of 5 $\mu$m or higher and at least 5 particles greater than 10 $\mu$m in diameter. More preferably, the alloy will contain, per said unit area, at least 5 particles having a size of 5 $\mu$m or higher, at least 5 particles having a size greater than 10 $\mu$m and at least 1 particle greater than 20 $\mu$m (and less than about 40 $\mu$m for the reasons noted above). However, for bearing alloys according to the present invention having the highest level of seizure resistance, the fatigue resistance is somewhat lower as may be seen by referring to the data of the tables presented below.

The improved seizure resistance of the bearing alloy according to the present invention in which the shape, size and number of Si particles are controlled according to the limitations described above is believed to be due to the ability of the Si particles to prevent the well-known adhesion phenomenon between aluminum base bearings and the shaft supported thereby and to reduce the surface roughness of the shafts. Aluminum tends to rub off onto a rotating shaft and to adhere thereto and there is a tendency for the aluminum on the shaft to adhere to that of the bearing. It is believed that the nodular Si particles tend to remove the aluminum from the shaft.

The apparent ability of the silicon particles of the aluminum base bearing according to the present invention to reduce the surface roughness of the shaft to be supported by the bearing is most pronounced with the use of shafts having a hard and coarse surface and, particularly, with the use of nodular graphite cast iron shafts. With conventional aluminum base bearings, grinding burrs which are formed around the graphite particles on the surface of the shaft tend to grind, or wear, the surface of the bearing material. The nodular Si particles of the alloy according to the present invention, however, are believed to smooth over the roughness of the surface of the nodular shafts because of the number and size of the hard Si particles. It is noted that the improved wear resistance and antiseizing property of the bearing alloy according to the present invention is not obtained unless the shape, size and number of the Si particles are controlled as noted above.

The seizure resistance, fatigue resistance and wear resistance of the bearing alloy according to the present invention are determined according to tests under dynamic loads which are described more fully below in conjunction with specific embodiments of the alloy. The properties of the alloy cannot be defined easily in quantitative terms because the values depend on the design of the testing equipment and test conditions and such equipment and conditions are not standard in the art.

The aluminum base bearing alloy according to the present invention also contains at least one element selected from Pb, In, Tl, Cd and Bi. The addition of 0.5–8 wt.% of Pb, In, Tl, Cd and/or Bi to the bearing alloy improves the conformability and seizure resistance of the bearing material. An amount of less than 0.5 wt.% does not appreciably affect the properties of the alloys. Amounts greater than 8 wt.% are not desirable since the effects of the additional amounts are not significant.

In other embodiments of the aluminum base bearing alloy according to the present invention, the alloy may also contain at least one of the following elements; copper (Cu), magnesium (Mg) and chromium (Cr) manganese (Mn). Cu and Mg are employed alone or in a mixture thereof and are employed in an amount of from about 0.1-2 wt.%. Cr is employed in an amount of from about 0.1-1 wt.%.

Cu and/or Mg can be contained in the bearing alloy of the invention in an amount of 0.1-2 wt.%. The Cu and/or Mg have an important effect on the hardness of the aluminum matrix and reduce the lowering of the hardness at high temperatures. The hardness of the alloy is increased as the amount of Cu and/or Mg is increased within this range whereas the seizure resistance decreases. Therefore, the amount of Cu and/or Mg employed is chosen so as to obtain a desired balance between the hardness and seizure resistance of the bearing alloy. An increase in the hardness of the alloy is not obtained with amounts of Cu and/or Mg of less than 0.1 wt.%. Amounts of these metals of more than 2.0 wt.% reduce the rolling property of the bearing alloy and lower the anti-corrosiveness. Furthermore, the Mg exists as a solid solution in the aluminum matrix and is liable to deposit during the annealing if the amount thereof is more than 2.0 wt.%.

The addition of 0.1-1 wt.% of Cr and/or Mn to a bearing alloy according to the present invention is also effective in preventing the lowering of the hardness of the alloy at high temperatures (although to a lesser extent than the addition of Cu and/or Mg). When the quantity of the Cr and/or Mn is less than 0.1 wt.%, the improvement in high temperature hardness cannot be expected. The effect of the addition of amount of more than 1.0 wt.% is not appreciable. The Cr and/or Mn forms fine precipitates in the aluminum matrix. The Cr and/or Mn also serves to enhance the effects of the Pb, In, Tl, Cd and/or Bi and of the addition of the Cu and/or Mg.

The aluminum matrix of the bearing alloy according to the present invention preferably has a Vickers hardness (Hv) of from about 30 to 60. If the aluminum matrix is too soft, the load capacity of the bearing is insufficient and when a load is applied to the bearing, the silicon particles are pushed into the surface. If the aluminum matrix is too hard, when a shaft contacts the bearing surface, the silicon particles are removed from the surface and will not become embedded again but will roll between the shaft and the bearing and cause excessive wear.

The aluminum base bearing alloy according to the present invention is prepared by melting aluminum in a gas furnace and adding desired amounts of Si and one or more of Pb, In, Tl, Cd and Bi and, depending on the desired properties of the alloy, the optional elements such as Cu, Cr and the like, to the molten aluminum according to the conventional techniques. The molten alloy is cast and the cast alloy is then subjected to steps of peeling; repeated (if necessary) rolling and annealing to obtain a sheet of the alloy of desired thickness; slitting; annealing; sanding; brushing and the like to obtain bearing alloy pieces. These pieces are then applied to backing steel sheets by conventional pressure welding techniques to obtain bimetal pieces which are then subjected to annealing and coiling. These annealed pieces can then be worked into plain bearings. The foregoing steps employed in the process of the present invention are, per se, known in the art relating to the preparation of aluminum base bearings and are disclosed, for example, in U.S. Pat. Nos. 3,078,563; 3,093,885; 3,104,135; 3,167,404; 3,300,836; 3,300,838 and 3,384,950. The processes for preparing aluminum base bearings disclosed in these patents are incorporated herein by reference.

Control of the size and number of nodular silicon particles in the bearing alloy which meet the limitations described above, i.e., at least 5 particles having a size of at least 5 $\mu$m, may be obtained by controlled annealing of the cast alloy according to conditions not previously disclosed in the art. Specifically, in the process employed in the present invention, during the rolling and annealing of the cast alloy, annealing is carried out at temperature of 280°-550° C. for 1.5 to 6 hours. Following slitting, annealing is carried out at a temperature of greater than 350° C. and up to 550° C. for 1.5 to 6 hours followed by controlled cooling at a rate of less than 200° C. per hour. Following bonding to the backing steel by pressure welding, annealing is carried out at a temperature of 300°-400° C. for 1 to 2 hours.

The distinctions between the process employed in the present invention for obtaining the aluminum base bearing alloy and bearing composite wherein the alloy contains silicon particles of specified shape, size and number and the prior art processes may be better understood by referring to Table 1.

As noted previously, the aluminum base bearing composite according to the present invention is prepared by pressure welding the aluminum base bearing alloy according to the present invention to a backing steel according to conventional techniques and annealing the resultant composite at a temperature of 300° to 400° C. for 1 to 2 hours. The aluminum base bearing composite according to the present invention can be used as a bearing for internal combustion engines under conditions of high load without the need of a lead overlayer, or overplate, which is required for conventional aluminum base bearings.

TABLE 1

| | Step | Prior Art Process(es) | Process Employed in Present Invention |
|---|---|---|---|
| (1) | Dissolution | Melting at 670-750° C. | + |
| (2) | Casting | 1.5-2.5 m/min (1-2 m/min) | + |
| (3) | Peeling | Reduce thickness about 2mm | + |
| (4) | Rolling | 2-6 mm/pass | + |
| (5) | Annealing | 180-230° C. for about 1.5 hours (≦350° C. for about 1.5 hours) Steps (4) and (5) repeated, if necessary | 280-550° C. for 1.5 to 6 hours |
| (6) | Rolling | 2-6 mm/pass | + |
| (7) | Slitting | No conditions specified | + |
| (8) | Annealing | 180-230° C. for about 1.5 hours No control of cooling speed (≦350° C. for about 1.5 hours No control of cooling speed) | Greater than 350° C.-550° C. for 1.5 to 6 hours Cooling speed: less than 200° C./hour |
| (9) | Sanding | 0.01-0.05 mm | + |
| (10) | Brushing | No conditions specified | + |
| (11) | Pre-heating | 100-180° C. | + |

TABLE 1-continued

| Step | | Prior Art Process(es) | Process Employed in Present Invention |
|---|---|---|---|
| | | (60–140° C.) | |
| (12) | Sanding | 0.005–0.05 mm | + |
| (13) | Cleaning | Trichloroethylene | + |
| (14) | Ni-plating | Thickness < 5 μm | + |
| (15) | Pre-heating | 80–230° C. | + |
| (16) | Bonding (Pressure welding) | Reduction ratio: 45–55% (45–60%) | + |
| (17) | Annealing | 180–230° C. for about 1.5 hours (≦ 350° C. for about 1.5 hours) | 300–400° C. for 1–2 hours |
| (18) | Coiling | No conditions specified | + |

Note:
(1) Conditions in parentheses are isolated teachings in the prior art.
(2) Steps (12)–(15) apply to the backing steel to which the alloy is bonded in step (16).

The present invention may be better understood by referring to the accompanying drawings in light of the following description and data.

The seizure resistance, fatigue resistance and wear resistance data presented below and shown in the drawings were measured under conditions as described in Table 2. The seizure resistance test measures the static load necessary to cause seizure at constant oil temperature. The fatigue resistance test measures fatigue limits under dynamic load conditions and under forced lubrication with lubricant oil of a constant temperature and by using a quenched shaft material rotating at 3000 rpm and with $10^7$ times repetition of stressing. The wear resistance tests measure the amount of wear of a bearing material at a constant load with respect to a shaft rotating at a constant speed.

Aluminum base bearing alloys according to the present invention were prepared by a process as described above employing the conditions listed in Table 1. Each of the alloys contained, in addition to aluminum, 4 wt.% Pb, 0.5 wt.% Cu and 0.4 wt.% Cr and an amount of Si as listed in Table A below. Each of the samples of Table A was annealed at a temperature of 350° C. for 1.5 hours in step (5) of the process (refer to Table 1). Cooling conditions following annealing were not controlled. Annealing and cooling conditions in step (8) of the process were controlled as listed in Table A so that each of the alloys contained 30–35 nodular particles of Si having a size of 5–10 μm, 8–11 nodular particles of Si having a size of more than 10 and up 20 μm, and 2–4 nodular particles of Si having a size of more than 20 and up to 40 μm, the balance of the Si being particles of less than 5 μm.

TABLE 2

| Tester | Test Conditions |
|---|---|
| A = Seizure Tester | Shaft material: Nodular |
| | Lubricant type: SAE 10W-30 |
| | Shaft surface roughness: 0.4–0.6 μm Rz |
| | Oil temperature: 140 ± 2.5° C. |
| | Rotation speed: 1000 rpm |
| | Shaft diameter: 52 mm |
| | Shaft hardness: Hv 200–300 |
| | Urging load: 50 kg/cm²/30 min (increase gradually). |
| | Bearing surface roughness: 1–1.8 μm Rz |
| | Bearing inner diameter: 52 mm |
| B = Fatigue Tester | Shaft material: AISI 1055 (forged) |
| | Lubricant type: SAE 10W-30 |
| | Shaft surface roughness: 0.8 μm Rz |
| | Oil temperature: 140 ± 2.5° C. |
| | Oil pressure: 5 kg/cm² |
| | Rotation speed: 3000 rpm |
| | Shaft diameter: 52 mm |
| | Shaft hardness: Hv 500–600 |
| | Stress repititions: $10^7$ times |

TABLE 2-continued

| Tester | Test Conditions |
|---|---|
| | Bearing surface roughness: 1–1.8 μm Rz |
| | Bearing inner diameter and width: 52 × 20 mm |
| C = Wear Tester | Shaft material: Nodular |
| | Lubricant type: Liquid paraffin |
| | Shaft surface roughness: 0.8–0.9 μm Rz |
| | Rotation speed: 100 rpm |
| | Shaft diameter: 40 mm |
| | Shaft hardness: Hv 200–300 |
| | Urging load: 25 kg |
| | Term of test: 5 hours |
| G = Wear Tester | Shaft material: Nodular |
| | Lubricant type: Liquid paraffin |
| | Shaft surface roughness: 0.8–0.9 m Rz |
| | Rotation speed: 100 rpm |
| | Shaft diameter: 40 mm |
| | Shaft hardnes: Hv 200–300 |
| | Urging load: 25 kg |

The seizure resistance of these alloys were measured employing the conditions for seizure tester A listed in Table 2. Each sample was tested three times under the same conditions. The seizure unit load values obtained are shown in FIG. 1.

For comparison, alloys of the same composition as those of Table A were prepared according to the same process but without control of the size and number of the Si particles by carrying out annealing in step (8) at 300° C. for 1.5 hours and by not controlling the cooling rate of the annealed samples. Seizure resistance of these alloys determined in the same manner as those of the alloys of Table A are shown in FIG. 2.

Figure 1:
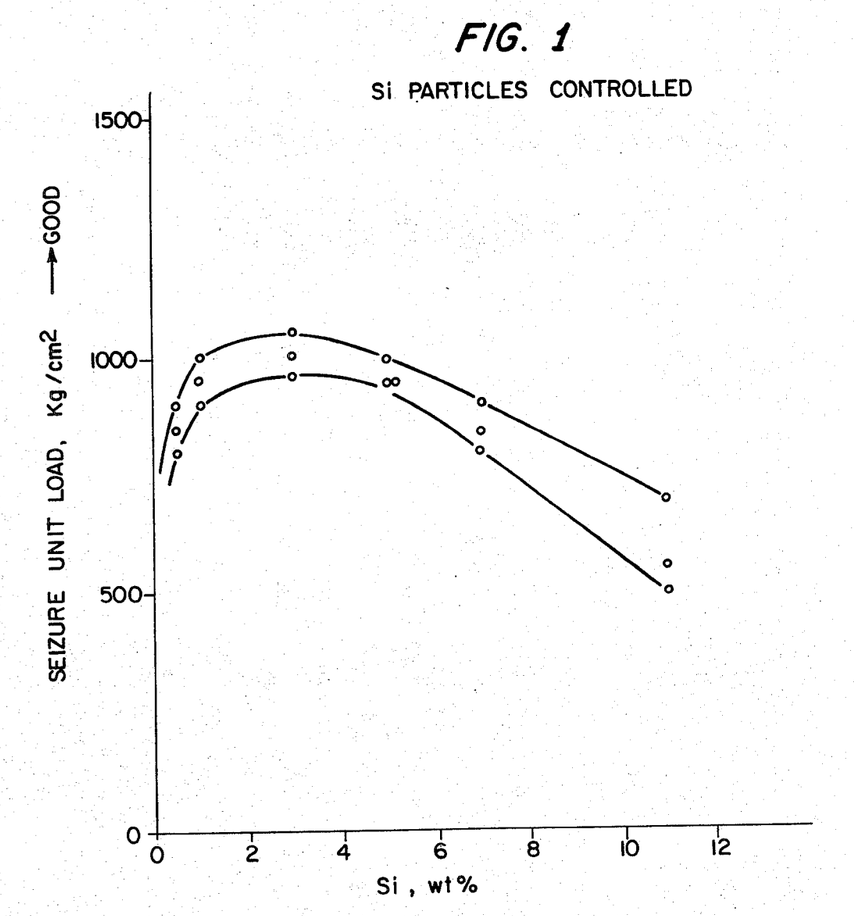
FIG. 1 is a graph showing seizure unit loads (seizure resistance) of aluminum base bearing alloys according to the present invention as a function of Si content of the alloy.
Figure 2:
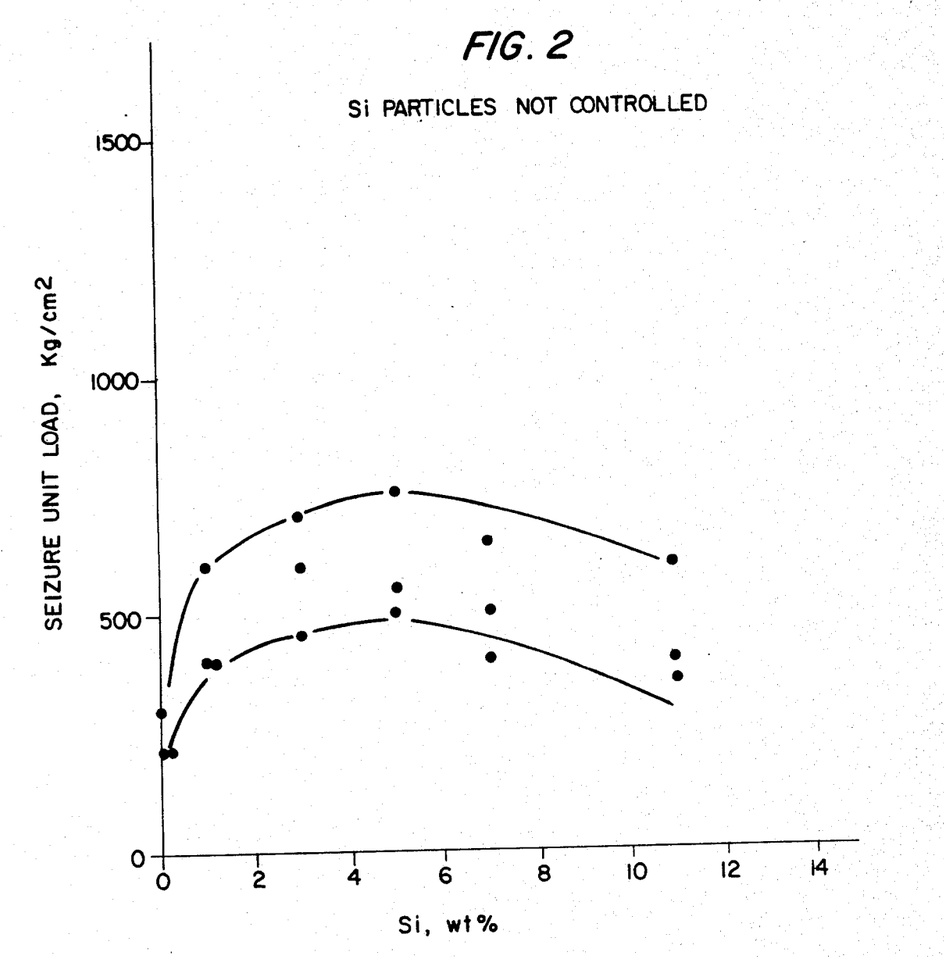
FIG. 2 is a graph showing seizure unit loads versus silicon content of alloys having the same composition as those of FIG. 1 but in which the Si particle size is not controlled.

It can be seen by referring to the data of FIGS. 1 and 2 that the aluminum base bearing alloys of the present invention in which the shape, size and number of silicon particles are controlled, have far better seizure resistance than similar alloys prepared according to prior art procedures where there is no control of silicon particle formation.

TABLE A

| | | Annealing condition (Step (8)-Table 1) | | |
|---|---|---|---|---|
| Sample No. | Si (wt. %) | Temperature (°C.) | Time (Hr) | Cooling (°C./Hr) |
| 1 | 0.5 | 500 | 5.0 | 100 |
| 2 | 1 | 475 | 4.5 | 120 |
| 3 | 3 | 450 | 4.0 | 140 |
| 4 | 4.7 | 425 | 3.5 | 160 |
| 5 | 7 | 400 | 3.0 | 180 |
| 6 | 11 | 360 | 2.0 | 200 |

Figure 3:
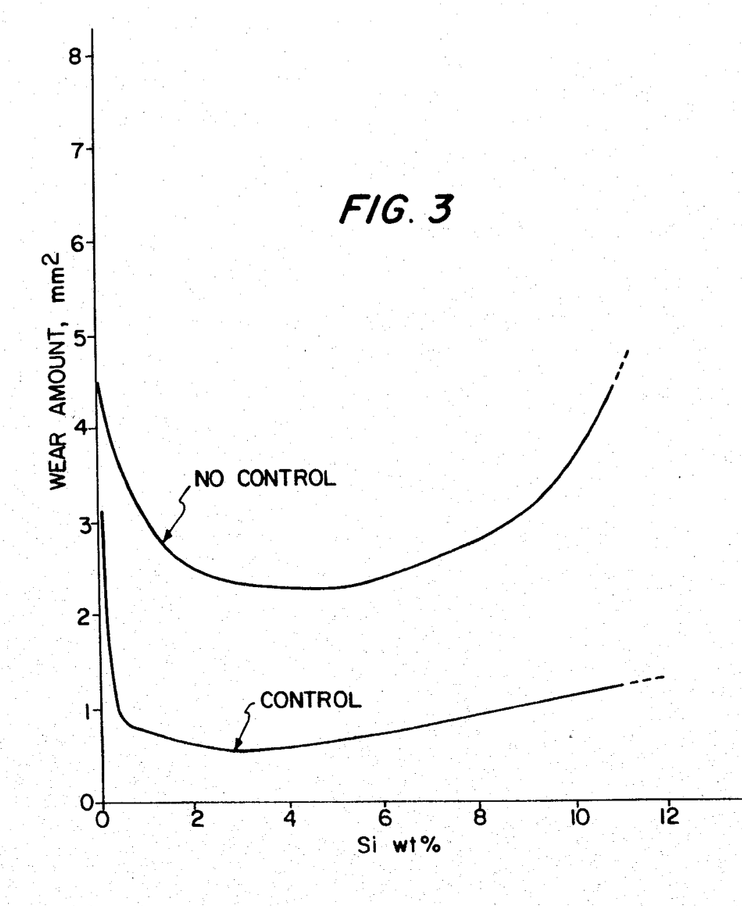
FIG. 3 is a graph showing a comparison of the wear resistance versus Si content of aluminum base bearing alloys according to the present invention with that of similar alloys in which Si particle size is not controlled.

The wear resistance of the alloys of Table A was measured according to the conditions listed for wear tester C in Table 2. The wear data for these alloys are shown in FIG. 3 (labelled "Control"). The wear resistance of alloys of the same composition but produced without control of the Si particles was similarly determined and the data are also shown in FIG. 3 (labelled "No control").

The aluminum base bearing alloys according to the present invention are seen to be markedly superior in wear resistance.

Figure 4:
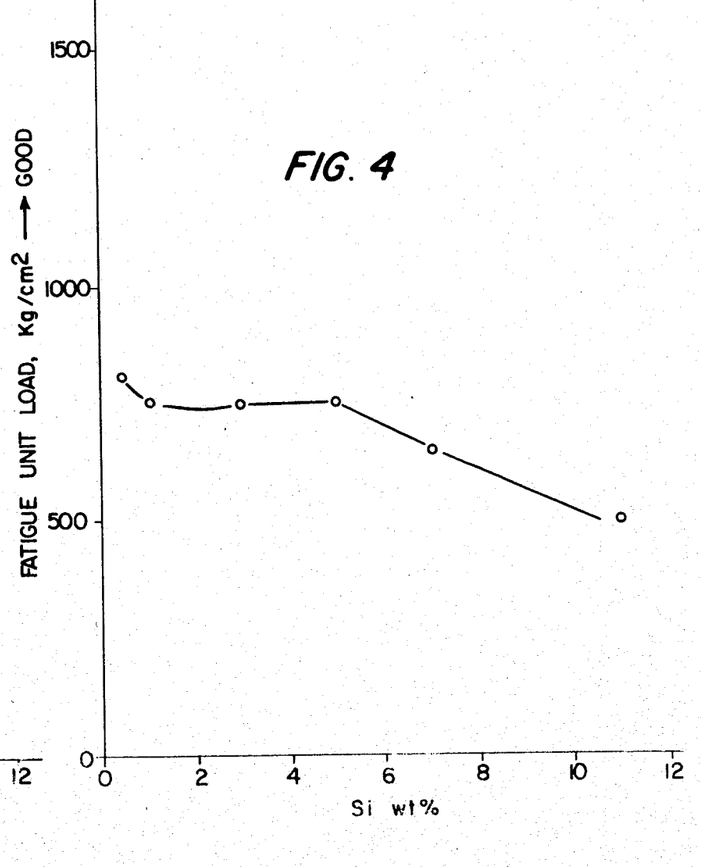
FIG. 4 is a graph showing fatigue unit loads (fatigue resistance) of aluminum base bearing alloys according to the present invention as a function of the Si content of the alloys.

The fatigue resistance of the alloys of Table A was measured according to the conditions for fatigue tester B listed in Table 2. The fatigue unit load data is shown in FIG. 4. It is seen that the fatigue resistance of the alloys of the invention remains relatively constant as the Si content is varied within the range of 0.5–5.0 wt.%.

Figure 6:
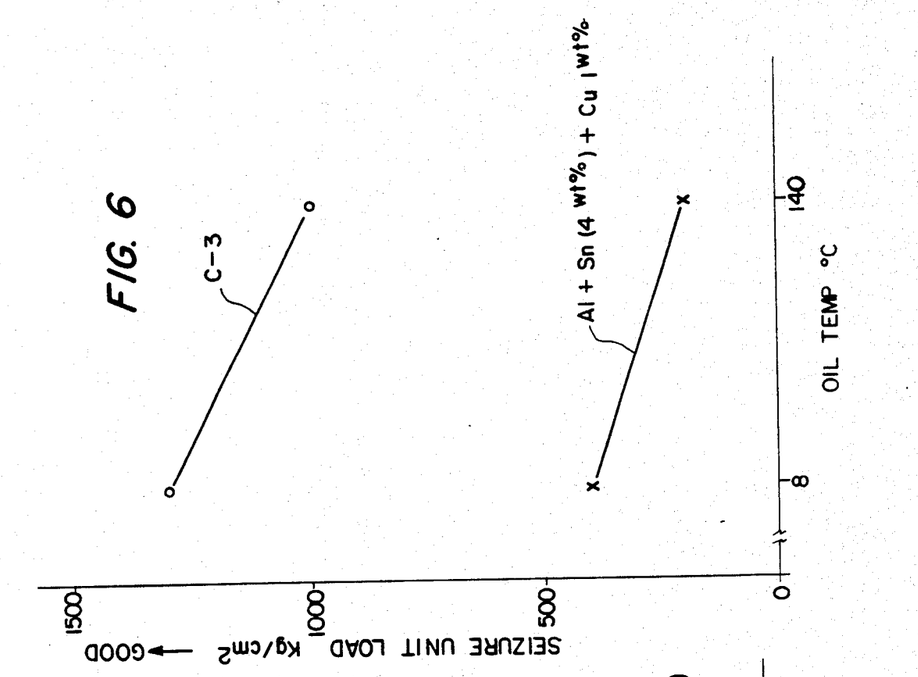
FIG. 6 is a graph showing seizure unit loads of an aluminum base bearing alloy according to the present invention and of a conventional Al-Sn(4)-Cu(1) alloy as a function of oil temperature.

Aluminum base bearing alloys according to the present invention having the composition: Si 3 wt.%, Pb 4 wt.% Cu 0.5 wt.% and Cr 0.4 wt.%, the balance being aluminum, were prepared according to the process described above and employing the conditions for the process employed in the present invention described in Table 1. Annealing conditions in step (8), Table 1, were varied to produce alloy samples A-1 to A-3, B-1 to B-3, C-1 to C-3, D-1 to D-3, E-1 and E-2 containing the distribution of nodular Si particles set forth in Table B.

temperature varied as shown in FIG. 6. It is seen that the seizure resistance of the alloys decreases as the temperature of the lubricating oil increases but that the seizure resistance of the alloy of the invention is maintained at a relatively high level even at a high oil temperature.

Figure 7:
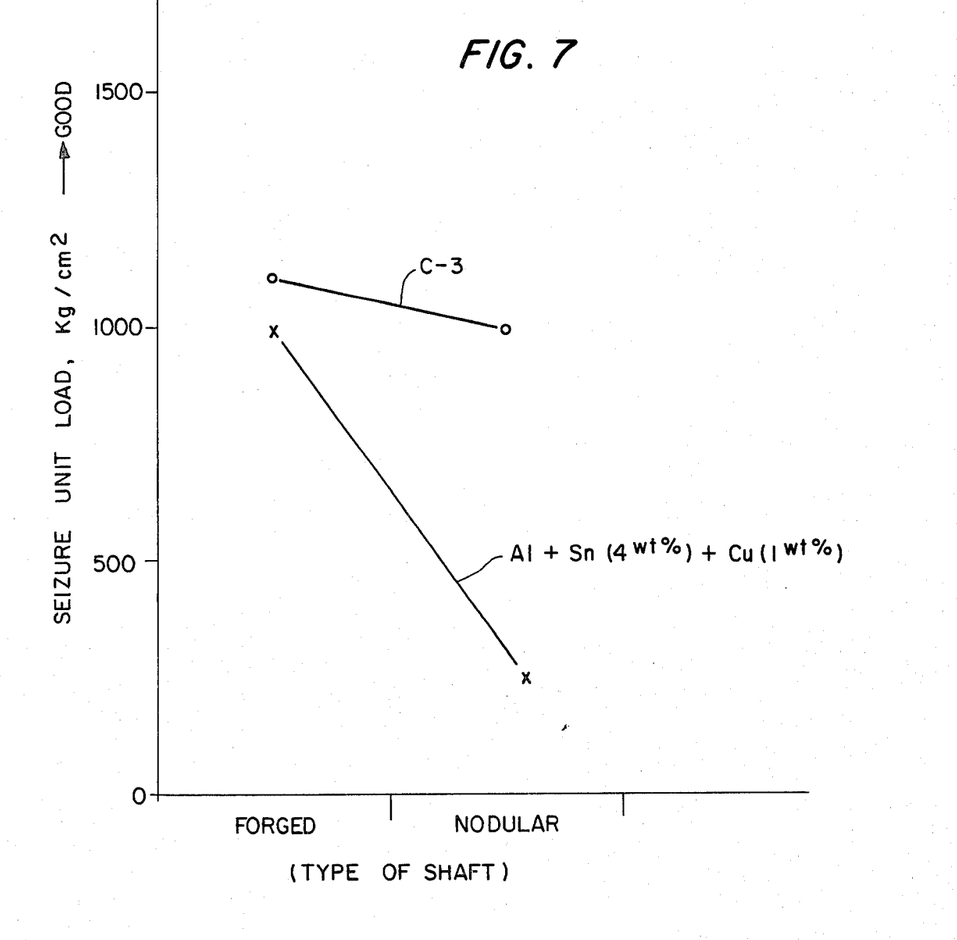
FIG. 7 is a graph comparing seizure unit loads of an aluminum base bearing alloy according to the present invention with those of a conventional Al-Sn(4)-Cu(1) alloy as a function of the type of supported shaft.

FIG. 7 compares the seizure resistance of alloy sample No. C-3 of Table B with that of a conventional Al-Sn(4)-Cu(1) alloy for forged shaft and for a nodular graphite cast iron shaft. The data of FIG. 7 was obtained employing the conditions of seizure tester A of Table 2 employing the different shafts. FIG. 7 illustrates that an aluminum base bearing alloy of the present invention provides markedly superior seizure resistance with the use of a nodular graphite cast iron shaft as compared to the conventional alloy.

Figure 8:
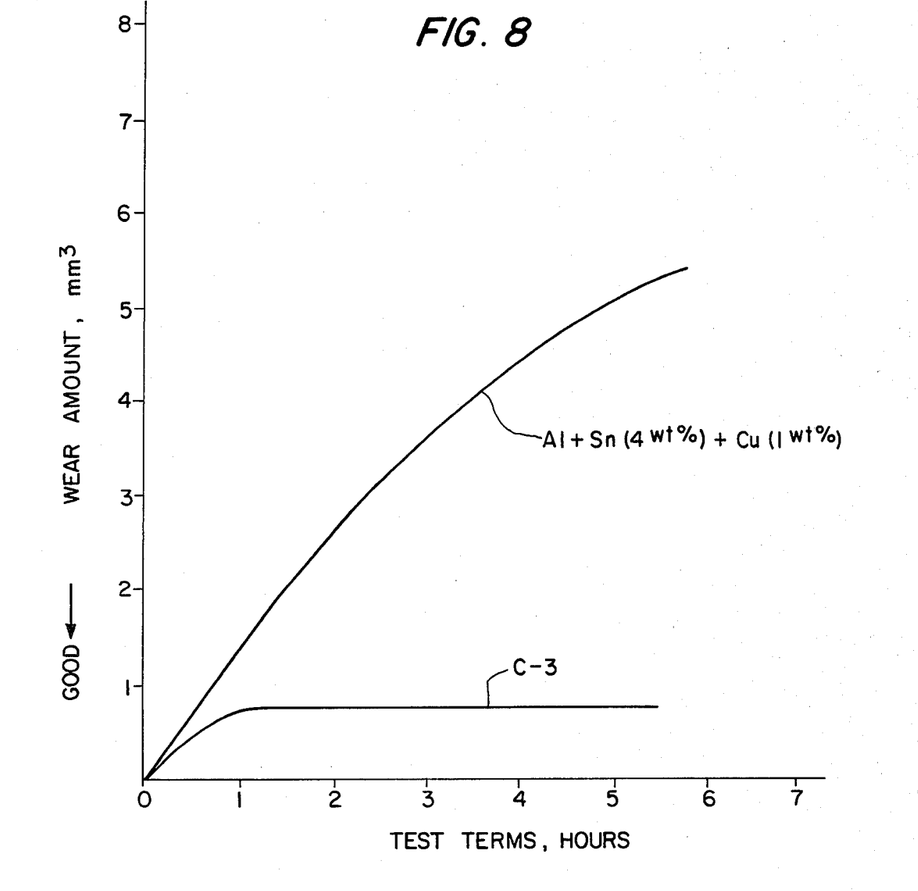
FIG. 8 is a graph comparing wear resistance of an aluminum base bearing alloy according to the present invention with that of a conventional Al-Sn(4)-Cu(1) alloy as a function of time.

FIG. 8 compares the wear resistance of alloy sample No. C-3 of Table B with that of a conventional Al-Sn(4)-Cu(1) alloy as a function of time. It is seen that the alloy of the invention initially shows slight wear but that after about 1 hour there is no additional wear. On the other hand, the conventional alloy is continuously worn throughout the test.

To demonstrate the outstanding seizure and fatigue resistance of the aluminum base bearing alloys according to the present invention having different Si contents,

TABLE B

| Sample No. | No. of Si particles/$3.56 \times 10^{-2}$ (mm)$^2$ | | | | |
|---|---|---|---|---|---|
| | less than 5 μm | 5–10 μm | 10 < –20 μm | 20 < –30 μm | 30 < –40 μm |
| A 1 | about 155* | 0 | 0 | 0 | 0 |
| 2 | about 293* | 0 | 0 | 0 | 0 |
| 3 | about 436* | 0 | 0 | 0 | 0 |
| B 1 | Bal. | 5 | 0 | 0 | 0 |
| 2 | " | 32 | 0 | 0 | 0 |
| 3 | " | 93 | 0 | 0 | 0 |
| C 1 | " | 37 | 6 | 0 | 0 |
| 2 | " | 49 | 21 | 0 | 0 |
| 3 | " | 41 | 33 | 0 | 0 |
| D 1 | " | 53 | 21 | 6 | 0 |
| 2 | " | 34 | 14 | 11 | 0 |
| 3 | " | 44 | 18 | 15 | 0 |
| E 1 | " | 32 | 18 | 4 | 1 |
| 2 | " | 45 | 13 | 7 | 5 |

*No. of Si particles of 2–<5 μm.

Figure 5:
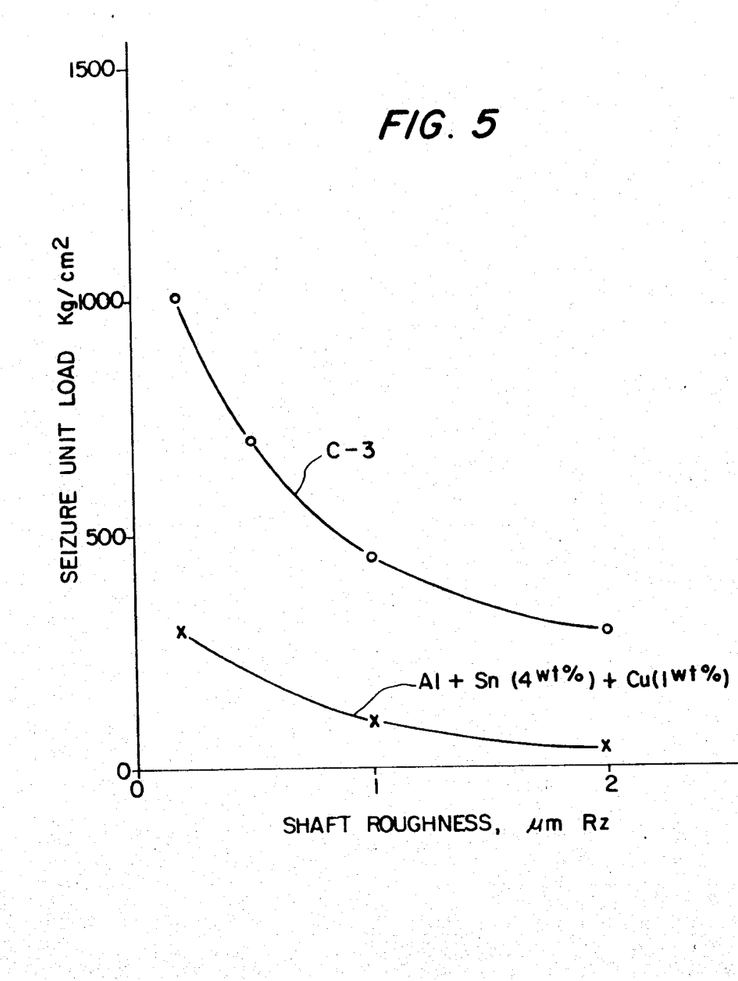
FIG. 5 is a graph showing seizure unit loads of aluminum base bearing alloys according to the present invention as a function of surface roughness of a supported shaft.

The seizure resistance of sample No. C-3 as a function of shaft roughness is shown in FIG. 5. The seizure resistance data was determined in accordance with the conditions listed in Table 2 for seizure tester A and by varying the shaft roughness as shown in FIG. 5. For comparison, the seizure resistance of a conventional Al-Sn(4)-Cu(1) alloy is also shown in FIG. 5. It is seen that the seizure resistance of the alloy of the invention containing nodular Si particles of a specified number and size is superior to that of a conventional aluminum base bearing alloy.

The seizure resistance of alloy sample C-3 of Table B and of a conventional Al-Sn(4)-Cu(1) alloy as a function of oil temperature are shown in FIG. 6. The seizure resistance data was obtained according to the conditions of seizure tester A listed in Table 2 with the oil bearing alloys having a Pb content of 4 wt.%, Cu content of 0.5 wt.% and Cr content of 0.4 wt.% and Si content as shown in Table C, the balance being Al, were prepared according to the process described above and employing the conditions of the process employed in the present invention listed in Table 1. The annealing conditions (step (8), Table 1) were varied to produce nodular Si particles having the number and size distribution listed in Table C.

The data of Table C demonstrates that for each of the Si contents, the seizure resistance of the alloy is increased as the number and size of the Si particles increase whereas the fatigue resistance is decreased slightly for bearing alloys containing larger Si particles.

TABLE C

| Sample No. | Si (wt. %) | Silicon particles per $3.56 \times 10^{-2}$(mm)$^2$ | | | | Seizure Unit Load (Seizure tester A) (Kg/cm$^2$) | Fatigue Unit Load (Fatigue tester B) (Kg/cm$^2$) |
|---|---|---|---|---|---|---|---|
| | | <5 μm | 5–10 μm | 10 < –20 μm | 20 < –40 μm | | |
| A-1 | 0.5 | Bal | 0 | — | — | 300 | 800 |
| A-2 | " | " | 3 | — | — | 350 | 750 |
| A-3 | " | " | 5 | — | — | 500 | 750 |
| A-4 | " | " | 11 | — | — | 550 | 750 |
| A-5 | " | " | 29 | — | — | 600 | 750 |

TABLE C-continued

| Sample No. | Si (wt. %) | Silicon particles per $3.56 \times 10^{-2}$(mm)² | | | | Seizure Unit Load (Seizure tester A) (Kg/cm²) | Fatigue Unit Load (Fatigue tester B) (Kg/cm²) |
|---|---|---|---|---|---|---|---|
| | | <5 μm | 5-10 μm | 10<—20 μm | 20<—40 μm | | |
| A-6 | " | " | 13 | 5 | — | 700 | 750 |
| A-7 | " | " | 30 | 10 | 1 | 900 | 700 |
| A-8 | " | " | 3 | 2 | — | 500 | 750 |
| B-1 | 1 | Bal | 0 | — | — | 350 | 800 |
| B-2 | " | " | 5 | — | — | 500 | 750 |
| B-3 | " | " | 10 | — | — | 550 | 750 |
| B-4 | " | " | 30 | — | — | 600 | 750 |
| B-5 | " | " | 11 | 5 | — | 700 | 750 |
| B-6 | " | " | 31 | 11 | 5 | 1000 | 700 |
| B-7 | " | " | 31 | 4 | — | 700 | 750 |
| B-8 | " | " | 3 | 2 | — | 500 | 750 |
| C-1 | 3 | Bal | 0 | — | — | 400 | 750 |
| C-2 | " | " | 5 | — | — | 550 | 700 |
| C-3 | " | " | 11 | — | — | 600 | 700 |
| C-4 | " | " | 40 | — | — | 650 | 700 |
| C-5 | " | " | 41 | 11 | — | 850 | 650 |
| C-6 | " | " | 64 | 40 | 9 | 1100 | 600 |
| C-7 | " | " | 65 | 5 | — | 800 | 650 |
| C-8 | " | " | 3 | 2 | — | 550 | 700 |
| D-1 | 4.7 | Bal | 0 | — | — | 450 | 700 |
| D-2 | " | " | 5 | — | — | 600 | 650 |
| D-3 | " | " | 22 | — | — | 650 | 650 |
| D-4 | " | " | 34 | 2 | — | 750 | 600 |
| D-5 | " | " | 65 | 20 | — | 850 | 550 |
| D-6 | " | " | 128 | 33 | 2 | 1100 | 500 |
| D-7 | " | " | 125 | 5 | — | 850 | 600 |
| D-8 | " | " | 3 | 2 | — | 600 | 650 |

TABLE D

| Sample No. | Wt. % | Si particles/$3.56 \times 10^{-2}$(mm)² Si particle size (μm) | | | | Sn (wt. %) | Pb, In, Tl, Cd, Bi and Additional Elements (Wt. %) | | | Seizure (A) kg/cm² | Fatigue (B) kg/cm² |
|---|---|---|---|---|---|---|---|---|---|---|---|
| | | <5 | 5-10 | 10<—20 | 20<—40 | | | | | | |
| 1 | 0.5 | Bal | 5 | — | — | — | Pb(4) | Cu(0.5) | | 500 | 700 |
| 2 | " | " | 11 | — | — | — | Cd(4) | Cr(1) | | 550 | 800 |
| 3 | " | " | 53 | — | — | — | Bi(8) | | | 600 | 650 |
| 4 | " | " | 92 | — | — | — | Pb(5) | Cr(0.5) | | 650 | 800 |
| 5 | " | " | 10 | 5 | — | — | Cd(5) | | | 700 | 650 |
| 6 | " | " | 30 | 12 | 1 | — | Pb(4) | Cu(0.5) | Mn(0.4) 900 | 700 | |
| 7 | 1.0 | " | 5 | — | — | — | Tl(0.5) | Cr(0.5) | | 500 | 800 |
| 8 | " | " | 10 | — | — | — | Pb(1) | Cu(0.1) | Cr(0.1) | 550 | 750 |
| 9 | " | " | 54 | — | — | — | Pb(0.5) | | | 600 | 700 |
| 10 | " | " | 93 | — | — | — | Pb(3) | In(0.5) | Cr(0.8) | 650 | 750 |
| 11 | " | " | 12 | 5 | — | — | In(3) | Mg(1) | | 700 | 700 |
| 12 | " | " | 31 | 11 | 2 | — | Pb(2) | Cu(0.8) | Cr(0.2) 950 | 700 | |
| 13 | " | " | 54 | 12 | 5 | — | Pb(4) | Cu(0.5) | Cr(0.5) | 10.50 | 700 |
| 14 | 3.0 | " | 5 | — | — | — | Pb(3) | Tl(1) | Cu(0.2) Mg(0.3) | 600 | 700 |
| 15 | " | " | 32 | — | — | — | Bi(2) | | | 650 | 650 |
| 16 | " | " | 94 | — | — | — | Pb(6) | Mg(0.5) | Cr(0.5) | 700 | 700 |
| 17 | " | " | 11 | 5 | — | — | Pb(3) | Cu(2) | | 750 | 600 |
| 18 | " | " | 32 | 11 | 3 | — | Pb(4) | Cr(0.3) | | 1050 | 600 |
| 19 | " | " | 94 | 20 | — | — | In(2) | Cu(0.3) | Cr(0.2) | 950 | 600 |
| 20 | " | " | 4 | 1 | — | — | Cd(5) | Cu(1) | Mg(0.5) Cr(0.5) | 600 | 750 |
| 21 | 5.0 | " | 5 | — | — | — | Pb(3) | Cu(0.4) | Cr(0.6) | 650 | 700 |
| 22 | " | " | 31 | — | — | — | Pb(1) | Cu(0.2) | Cr(0.1) | 700 | 600 |
| 23 | " | " | 95 | — | — | — | Pb(2) | In(1) | Cu(0.1) | 800 | 550 |
| 24 | " | " | 25 | 5 | — | — | Pb(3) | Cu(1) | | 900 | 550 |
| 25 | " | " | 36 | 10 | 5 | — | Tl(3) | Cu(1.5) | Mn(1.0) | 1100 | 550 |
| 26 | " | " | 94 | 5 | — | — | Cd(3) | | | 950 | 500 |
| 27* | — | — | — | — | — | 20 | Cu(1) | | | 250 | 450 |
| 28* | 1.0 | x | x | x | x | 6 | Cu(1) | | | 300 | 500 |
| 29* | — | — | — | — | — | — | Pb(3) | Cu(1) | | 250 | 500 |
| 30* | — | — | — | — | — | 15 | Cr(0.5) | | | 300 | 700 |

*Comparison Examples
ˣSi particles controlled

Bearing alloys of the present invention having the compositions and nodular si particle distribution shown in Table D were prepared employing the process conditions listed in Table 1. For comparison, alloys not containing Si (Sample Nos. 27, 29 and 30 of Table D) and an alloy containing Si but in which the formation of Si particles was not controlled (Sample No. 28 of Table D) were also prepared and tested for seizure and fatigue resistance. The data of Table D show that aluminum base bearing alloys of the present invention containing Si and at least one of Pb, In, Tl, Cd and Bi, and, as optional components, Cu, Mg, Mn and/or Cr, possess outstanding seizure and fatigue resistance properties. More particularly, the data of Table D show that the alloys of the invention possess superior seizure resistance and comparable or better fatigue resistance as compared to alloys not containing Si and an alloy containing Si but in which Si particle formation is not controlled.

Although the present invention has been described in conjunction with certain preferred embodiments thereof, it is to be understood that the invention is not intended to be limited to these embodiments but, instead, is to include all those embodiments within the scope and spirit of the appended claims.

What is claimed is:

1. An aluminum base bearing alloy consisting essentially of 0.5-5 wt.% of Si, 0.5-8 wt.% of at least one element selected from the group consisting of Pb, In, Tl, Cd and Bi and, as the balance, aluminum, the alloy containing at least 5 particles of Si per $3.56 \times 10^{-2} (mm)^2$ of cross-sectional area thereof, said particles being nodular and having a particle size of at least 5 $\mu$m.

2. The aluminum base bearing alloy of claim 1, further comprising 0.1-2 wt.% of at least one element selected from the group consisting of Cu and Mg.

3. The aluminum base bearing alloy of claim 1, further comprising 0.1-2 wt.% of at least one element selected from the group consisting of Cu and Mg and 0.1-1 wt.% of at least one element selected from the group consisting of Cr and Mn.

4. The aluminum base bearing alloy of claim 1, further comprising 0.1-1 wt.% of at least one element selected from the group consisting of Cr and Mn.

5. A bearing material which is made by applying the aluminum base bearing alloy of any of claims 1-4 to a backing steel sheet by pressure welding.

* * * * *